(12) United States Patent
Coca et al.

(10) Patent No.: US 7,776,959 B2
(45) Date of Patent: Aug. 17, 2010

(54) COATINGS COMPRISING TERPENE

(75) Inventors: Simion Coca, Pittsburgh, PA (US);
James O'Dwyer, Valencia, PA (US);
Richard F. Karabin, Ruffs Dale, PA (US); Stephen J. Thomas, Aspinwall, PA (US); Victoria A. Trettel, Freeport, PA (US); Davina Schwartzmiller, Allison Park, PA (US); Jane N. Valenta, Pittsburgh, PA (US); Gregory J. McCollum, Gibsonia, PA (US); Richard J. Sadvary, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 483 days.

(21) Appl. No.: 11/564,570

(22) Filed: Nov. 29, 2006

(65) Prior Publication Data

US 2008/0121139 A1 May 29, 2008

(51) Int. Cl.
*C08L 33/04* (2006.01)
*C08L 99/00* (2006.01)
*C08G 65/34* (2006.01)

(52) U.S. Cl. ............................ 525/8; 528/425; 106/218

(58) Field of Classification Search ................ 106/218; 524/543, 556, 570; 525/8; 528/392, 396, 528/425

See application file for complete search history.

(56) References Cited

U.S. PATENT DOCUMENTS

| | | | | |
|---|---|---|---|---|
| 3,420,910 A | * | 1/1969 | Derfer et al. | 585/360 |
| 3,478,005 A | | 11/1969 | Wheeler | 260/80.7 |
| 3,761,457 A | | 9/1973 | Arlt, Jr. et al. | 260/88.2 |
| 3,923,759 A | | 12/1975 | Kennedy et al. | 260/88.2 |
| 4,564,718 A | | 1/1986 | Still et al. | |
| 4,857,574 A | * | 8/1989 | Buter | 524/396 |
| 5,756,624 A | * | 5/1998 | Behr et al. | 526/309 |
| 2004/0234753 A1 | | 11/2004 | Huseman et al. | 428/343 |

FOREIGN PATENT DOCUMENTS

| | | |
|---|---|---|
| DE | 71-2148662 | 9/1971 |
| DE | 4411556 A1 | 10/1995 |
| EP | 0 219 043 | 10/1986 |
| EP | 1 460 119 | 9/2004 |
| GB | 2147909 A | 5/1985 |
| GB | 2 406 097 A | 3/2005 |
| JP | 61 185502 | 8/1986 |
| JP | 08003513 | 1/2005 |
| JP | 2005298657 | 10/2005 |
| KR | 2001058969 A | 7/2001 |

OTHER PUBLICATIONS

English translation of KR-20010058969, Seong, 2001.*
English translation of KR 20010058969; Seong et al; Jul. 2001.*
Optically active terpolymer: synthesis and characterization by Prerna Shukla, Akhtar Ali, and A. K. Srivastava; *Journal of the Indian Chemical Society* (2000), 77 (1), 48-49.
Surface-active properties of a copolymer of methacrylic acid with α-pinene by E. V. Vorob'eva and N. P. Krut'ko; *Kolloidnyi Zhurnal* (1993), 55 (3), 16-20 (English Abstract).
Copolymers from α-pinene. Part I. Free radical copolymerization of methyl methacrylate with α-pinene by A. H. K. Yousafzai, Rasheed A. Khan, and Tehzeeb Akhtar; *Pakistan Journal of Scientific and Industrial Research* (1985), 28 (2), 135-8.
Terpolymers of ethylene and propylene with d-limonene and β-pinene by Ralph W. Magin, C. S. Marvel, and Edward F. Johnson; *Journal of Polymer Science, Part A: General Papers* (1965), 3 (11), 3815-23.
Novel turpentine series one-component polyurethane coatings by Lidui Huang, Jian Chen, Maocun Huang, Liangju Yan, Shijiang Chen, and Wenfu Zhou; *Tuliao Gongye* (2001), 31 (12), 7-10 (English Abstract).
Free radical copolymerization of limonene with butyl methacrylate: synthesis and characterization by Saroj Sharma and A. K. Srivastava; *Indian Journal of Chemical Technology* (2005), 12 (1), 62-67.
Synthesis and characterization of a terpolymer of limonene, styrene, and methyl methacrylate via a free-radical route by Saroj Sharma and A. K. Srivastava; *Journal of Applied Polymer Science* (2004), 91 (4), 2343-2347.
Colloid-chemical properties of polymeric complexes based on polycarboxylic acids and polyacrylamide by Elena Vorobieva, Irina Basalyga, and Mikolay Krutko; *Materials Research Innovations* (2003), 7 (5), 322-325.
Radical copolymerization of limonene with acrylonitrile: kinetics and mechanism by Saroj Sharma and A. K. Srivastava; *Polymer-Plastics Technology and Engineering* (2003), 42 (3), 485-502.
Synthesis of poly (β-pinene) -g-poly (meth) acrylate by the combination of living cationic polymerization and atom transfer radical polymerization by Jiang Lu, Hui Liang, Wei Zhang, and Qing Cheng; *Journal of Polymer Science, Part A: Polymer Chemistry* (2003), 41 (9), 1237-1242.
Synthesis of block and graft copolymers of β-pinene by Jiang Lu, Hui Liang, and Baoen Li; *Gaofenzi Xuebao* (2001), (6), 755-759 (English Abstract).
U.S. Appl. No. 11/564,579 filed Nov. 29, 2006, entitled: Epoxy Functional Polymers Comprising the Reaction Product of Terpene and an Epoxy Functional Monomer and Coatings Comprising Such Polymers.

* cited by examiner

*Primary Examiner*—Vasu Jagannathan
*Assistant Examiner*—Karuna P Reddy
(74) *Attorney, Agent, or Firm*—Diane R. Meyers

(57) ABSTRACT

Coatings comprising a polymer comprising a terpene and a monomer polymerized with terpene by free radical polymerization are disclosed. Coatings comprising terpene in greater than 30 wt % are also disclosed as are coatings comprising a terpene and a urea. Copolymers with terpene are also disclosed.

19 Claims, No Drawings

COATINGS COMPRISING TERPENE

FIELD OF THE INVENTION

The present invention relates generally to polymers comprising terpene and coatings comprising terpene.

BACKGROUND OF THE INVENTION

Prices of raw materials used in many manufacturing processes continue to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to a coating comprising a polymer comprising a terpene and a monomer that is polymerized with terpene by free radical polymerization, wherein the monomer is not maleic acid/anhydride.

The present invention is further directed to a cured coating comprising terpene in an amount greater than 30 wt %, based on solids, wherein the terpene is not in the form of a copolymer with phenol, cresol, or maleic acid/anhydride and glycol ester.

The present invention is further directed to a coating comprising terpene and a urea, wherein the urea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1.

The present invention is further directed to a polymer comprising 30 wt % terpene or greater, and less than 20 wt % of an olefinically unsaturated mono- and/or dicarboxylic acid containing 3 to 5 carbon atoms or anhydrides thereof, wherein wt % is based on total solid weight and wherein the polymer is prepared by free radical polymerization.

DETAILED DESCRIPTION OF THE INVENTION

The present invention is directed to coatings comprising a polymer comprising a terpene and a monomer that is polymerized with terpene by free radical polymerization. The polymer does not comprise maleic acid/anhydride. In certain embodiments the polymer specifically excludes methacrylates and in certain embodiments the copolymer is not a copolymer of terpene with phenol, cresol or isomers thereof.

Terpene, as used herein, includes α-pinene, β-pinene, terpinolene, limonene (dipentene), β-terpinene, γ-terpinene, α-thujene, sabinene, δ-$^3$-carene, camphene, β-cadinene, β-caryophyllene, cedrene, α-bisalbone, β-bisalbone, γ-bisalbone, zingiberene, humulene, (α-caryophyl-1-ene), α-citronellol, linalool, geraniol, nerol, ipsenol, α-terpineol, D-terpineol-(4), dihydrocarveol, nerolidol, farnesol, α-eudesmol, β-eudesmol, citral, D-citronellal, carvone, D-pulegone, piperitone, carvenone, bisabolene, β-selinene, α-santalene, vitamin A, abietic acid and mixtures of these compounds.

As noted above, the terpene is polymerized with a monomer that is polymerized with terpene by free radical polymerization. Such monomers include, for example, acrylic monomers having the following structure (I)

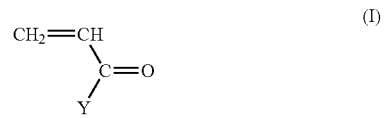

where Y is —NR$^1$$_2$, —O—R$^2$—O—C(=O)—NR$^1$$_2$, or —OR$^3$; R$^1$ is H, linear or branched C$_1$ to C$_{20}$ alkyl, or linear or branched C$_1$ to C$_{20}$ alkylol; R$^2$ is methyl, linear, acylic or branched C$_1$ to C$_{20}$ alkyl, alkenyl, aryl, alkaryl or aralkyl, and R$^3$ is H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical, or a propoxylated trimethylsilyl siloxane radical. A particularly useful type of acrylic monomers are those described by structure (I) where Y includes at least one functional group of epoxy, oxirane, carboxylic acid, hydroxy, amide, oxazoline, aceto acetate, isocyanate, or carbamate, and R$^2$ is a divalent linear or branched C$_1$ to C$_{20}$ alkyl linking group.

Examples of suitable monomers that fall within structure (I) include, but are not limited to, hydroxyethyl acrylate, hydroxypropyl acrylate, acrylic acid, methyl acrylate, ethyl acrylate, butyl acrylate, isobutyl acrylate, isobornyl acrylate, glycidyl acrylate, dimethylaminoethyl acrylate, acrylamide, perfluoro methyl ethyl acrylate, perfluoro ethyl acrylate, perfluoro butyl ethyl acrylate, trifluoromethyl benzyl acrylate, perfluoro alkyl ethyl acrylate, acryloxyalkyl terminated polydimethylsiloxane, acryloxyalkyl tris(trimethylsiloxy silane), acryloxyalkyl trimethylsiloxy terminated polyethylene oxide, chlorotrifluoro ethylene, glycidyl acrylate, 2-ethylhexyl acrylate, and n-butoxy methyl acrylamide.

Other suitable monomers that may be polymerized with terpene in the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. Still others include ethylenically unsaturated monomers such as isobutylene and derivatives thereof, methacrylates and styrenes.

The terpene and monomer are generally mixed together in the presence of a free radical polymerization initiator. Any standard free radical polymerization method can be used. In certain embodiments, a continuous process for making the polymer at high temperature (i.e. greater than 200° C.) and high pressure (i.e. greater than 500 psi) using low amounts of initiator (i.e. less than 10 wt %) are used. In certain embodiments, the polymerization is carried out in the substantial absence of Lewis acids and/or transition metals.

Any suitable free radical polymerization initiator may be used in the present invention. Suitable free radical initiators are typically thermal free radical initiators. Suitable thermal free radical initiators include, but are not limited to, peroxide compounds, azo compounds and persulfate compounds.

Examples of suitable thermal free radical initiator peroxide compounds include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

Examples of suitable thermal free radical initiator azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N, N'-dimethyleneisobutyramidine) dihydrochloride, 2-(carbamoylazo)-isobutyronitrile and mixtures thereof.

It will be further appreciated by those skilled in the art that the polymers used according to the present invention are random or alternating polymers. That is, the present polymers are distinct from polymers prepared, for example, by methods known in the art other than free radical polymerization, such as cationic polymerization, group transfer polymerization and atom transfer radical polymerization. Such methods can result in different polymer configurations that are "engineered", such as block copolymers.

Typically, the terpene comprises 10 to 60 wt %, such as 30 to 50 wt %, of the total solids weight of the polymer. In certain embodiments, the terpene comprises 30 wt % or greater, such as 50 wt %, or greater, of the polymer. The monomer can comprise 90 to 40 wt %, such as 70 to 50 wt % of the polymer. It will be appreciated that although reference is made throughout the specification and claims to "a" terpene and "a" monomer that is polymerized with terpene by free radical polymerization, mixtures of terpenes and/or such monomers can be used.

A "coating" according to the present invention will generally be understood as a composition that, when cured, can form a substantially continuous film that forms a surface layer that provides a decorative and/or protective function, and is not tacky or sticky when cured. Thus, in certain embodiments, the coatings according to the present invention would not include adhesives.

The coatings of the present invention can comprise 5 to 100 wt %, such as 10 to 70 or 10 to 40 wt %, based on total solids weight, of the polymer comprising a terpene and a monomer that is polymerized with terpene by free radical polymerization. For example, the coating may comprise 10 wt % or greater terpene, such as 20 wt % or greater, or 30 wt % or greater, with wt % based on total solids weight.

It will be appreciated that when terpene is used in a coating according to the present invention, alone or in polymer form, it can form part of the film-forming resin of the coating and in certain embodiments crosslinks with the other film-forming components. It is not added to function as a solvent, such as a solvent that is vaporized during cure, a chain transfer agent, a tackifier or other additive. It will be appreciated by those skilled in the art that a cured coating in which terpene or polymers thereof are used as a solvent, chain transfer agent, or tackifier or other additive would have a relatively low amount of terpene in it. In certain embodiments, compositions in which the terpene content in the cured coating is less than 10 wt %, such as 5 wt % or less, are specifically excluded.

In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or, alternatively, in solid particulate form, i.e., a powder coating.

Thermosetting or curable coating compositions typically comprise film forming polymers or resins having functional groups that are reactive with either themselves or a crosslinking agent. The film-forming resin can be selected from, for example, acrylic polymers, polyester polymers, polyurethane polymers, polyamide polymers, polyether polymers, bisphenol A based epoxy polymers, polysiloxane polymers, copolymers thereof, and mixtures thereof. Generally, these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, anhydride groups, acetoacetate acrylates, uretidione and combinations thereof.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

The coating compositions may also include a solvent. Suitable solvents include water, organic solvent(s) and/or mixtures thereof. Suitable solvents include glycols, glycol ether alcohols, alcohols, ketones, aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent".

If desired, the coating compositions can comprise other optional materials well known in the art of formulating coatings, such as plasticizers, anti-oxidants, hindered amine light stabilizers, UV light absorbers and stabilizers, surfactants, flow control agents, thixotropic agents, colorants, fillers, organic cosolvents, reactive diluents, catalysts, and other customary auxiliaries.

As used herein, "colorant" and like terms mean any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

The coatings of the present invention can be substantially clear. "Substantially clear" as used herein means that one can see through the coating and that objects viewed through the coating will be visible without significant distortion. It will be appreciated that use of certain colorants will still result in a coating that is substantially clear.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In certain specific embodiments of the present invention, the coating is a thermosetting composition comprising a non-gelled hydroxy functional polymer prepared as described above by polymerization of turpentine with a monomer polymerized with turpentine by free radical polymerization, such as an acrylate, and a crosslinking agent such as melamine and/or isocyanate.

The polymer described herein in conjunction with the crosslinking agent can itself comprise the film-forming resin, or one or more additional film-forming resins can be used, such as hydroxy functional acrylic polymers commonly used in the art, such as MACRYNAL 510 and JONCRYL 500. Such film-forming resins may be described in U.S. Pat. Nos. 5,965,670 and 7,053,149, both of which are hereby incorporated by reference.

In certain other embodiments, the coating is an electrodepositable coating composition comprising the polymer described above, alone or in combination with resins commonly used in electrodepositable coatings known in the art. Examples include cationic and anionic acrylic and epoxy resins.

It will be further appreciated that the coatings described herein can be either "one component" ("1K") or "two component" ("2K"), or even multi-component compositions. A 1K composition will be understood as referring to a composition wherein all of the coating components are maintained in the same container after manufacture, during storage, etc. A 1K coating can be applied to a substrate and cured by any conventional means, such as by heating, forced air, and the like. The present coatings can also be 2K coatings, which will be understood as coatings in which various components are maintained separately until just prior to application. Typically, one component of the 2K coating comprises a resin and the other component comprises a curing agent therefor. For example, one component can comprise an isocyante and the other a hydroxyl functional polymer, such as a polyester or acrylic.

As stated above, in certain embodiments, the copolymer described above will react with the other film-forming components, and become part of the film-forming resin of the coating.

The present coatings can be applied to any substrates known in the art, for example automotive substrates and industrial substrates. These substrates can be, for example, metallic, polymeric, transparent plastic substrates, polycarbonate, wood substrates, concrete, glass, and the like.

The coatings of the present invention can be applied by any means standard in the art such as electrocoating, spraying, electrostatic spraying, dipping, rolling, brushing, printing and the like. The coatings can be applied to a dry film thickness of 0.1 to 5 mils, such as 0.5 to 3.0 or 0.9 to 2.0 mils. Even thicker layers, such as 20 to 100 mils, or up to 150 mils, are contemplated in certain embodiments of the present invention. The coatings of the present invention can be used alone, or in combination with other coatings. For example, the coatings can be pigmented or unpigmented, and can be used as a primer, e-coat, base coat, top coat, automotive repair coat and the like. For substrates coated with multiple coatings, one or more of the coatings can be coatings as described herein.

The present invention is further directed to a cured coating comprising terpene in an amount of greater than 30 wt % based on solids, wherein the terpene is not a copolymer comprising phenol, cresol, or maleic acid/anhydride and glycol ester. The terpene can be any terpene described above, and can be in the form of a polymer, such as those described above. A "cured" coating, as used herein, refers to a coating that exhibits resistance to solvent.

The present invention is further directed to a coating comprising terpene and a urea, wherein the urea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1. The terpene can be added straight, or in the form of a polymer, such as those described above.

The present invention is further directed to a polymer comprising 30 wt % or greater, such as 50 wt % or greater, of terpene and less than 20 wt %, such as 10 wt % or less or 5 wt % or less, of an olefinically unsaturated mono- and/or dicarboxylic acid containing 3 to 5 carbon atoms or anhydrides thereof, wherein wt % is based on total solid weight, wherein the polymer is prepared by free radical polymerization. Suitable monomers can include any of those described above. These polymers can be prepared according to any of the above methods.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein to "a" terpene, "a" monomer, "a" polymer and the like, one or more of each of these and any other components can be used. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

Various polymers comprising terpenes were prepared as follows:

Example B

Synthesis of a copolymer comprising Turpentine/Isobutylene/Methyl acrylate/Hydroxypropyl acrylate The following ingredients were polymerized as set forth below:

|  | Ingredients | Parts by weight (grams) |
| --- | --- | --- |
| Charge 1 | Isobutylene | 127.00 |
|  | Turpentine[1] | 136.00 |
| Charge 2 | Di-tert Amyl Peroxide | 38.00 |
|  | Propylene glycol monomethyl ether | 38.00 |
| Charge 3 | Methyl Acrylate | 110.00 |
|  | Hydroxypropyl Acrylate | 280.00 |

[1]Available from Pinova, a subsidiary of Hercules Incorporated.

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charge 2 was added to the reactor over 2.0 hours. 15 minutes after Charge 2 was started, Charge 3 was added to reactor over 1.8 hours. During the monomer addition the temperature was maintained at 170° C. at 170 PSI. After Charge 2 and 3 were in the reactor, the reaction mixture was held for 2 hours. The reactor was then cooled to 25° C., and vented. The solids content of the resulting polymer was determined to be 74.33% determined at 110° C. for one hour. The copolymer had number average molecular weight, $M_n$=2430 and polydispersity $M_w/M_n$=2.1 (determined by gel permeation chromatography using polystyrene as a standard), and hydroxy value of 196.

Example C

Synthesis of a copolymer comprising beta-Pinene/Methyl acrylate/Hydroxypropyl acrylate/Acrylic acid The following ingredients were polymerized as set forth below:

|  | Ingredients | Parts by weight (grams) |
| --- | --- | --- |
| Charge 1 | Beta-Pinene[2] | 127.00 |
|  | Methyl Acrylate | 98.00 |
|  | Hydroxypropyl Acrylate | 120.00 |
|  | Butyl Acetate | 180.00 |
| Charge 2 | Di-tert Amyl Peroxide | 172.50 |
| Charge 3 | Methyl Acrylate | 882.00 |

-continued

| Ingredients | Parts by weight (grams) |
|---|---|
| Beta-Pinene | 1365.00 |
| Hydroxypropyl Acrylate | 1080.00 |
| Acrylic Acid | 70.00 |
| Butyl Acetate | 125.00 |

[2] Available from Pinova.

Charge 1 was added to a 4-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170° C. at 136 PSI. After Charge 2 and 3 were in the reactor, the reaction mixture was held for 2 hours. The reactor was then cooled to 25° C., and vented. The solids content of the resulting polymer was determined to be 74.91% determined at 110° C. for one hour. The copolymer had number average molecular weight, $M_n$=2350 and polydispersity $M_w/M_n$=2.6 (determined by gel permeation chromatography using polystyrene as a standard), and hydroxy number of 137.

Example D

Synthesis of a copolymer comprising beta-Pinene/Isobutylene/Methyl acrylate/Hydroxypropyl acrylate/Acrylic acid The following ingredients were polymerized as set forth below:

| | Ingredients | Parts by weight (grams) |
|---|---|---|
| Charge 1 | Beta-Pinene | 25.75 |
| | Methyl Acrylate | 16.66 |
| | Hydroxypropyl Acrylate | 20.40 |
| | Acrylic acid | 1.19 |
| | Isobutylene | 95.20 |
| Charge 2 | Di-tert Amyl Peroxide | 29.32 |
| | Butyl Acetate | 30.62 |
| Charge 3 | Methyl Acrylate | 149.94 |
| | Beta-Pinene | 231.80 |
| | Hydroxypropyl Acrylate | 183.60 |
| | Acrylic Acid | 10.71 |

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170° C. at 262 PSI. After Charge 2 and 3 were in the reactor, the reaction mixture was held for 2 hours. The reactor was then cooled to 25° C., and vented. The solids content of the resulting polymer was determined to be 79.48% determined at 110° C. for one hour. The copolymer had number average molecular weight, $M_n$=2330 and polydispersity $M_w/M_n$=2.6 (determined by gel permeation chromatography using polystyrene as a standard), and hydroxy number of 123.

Example E

Synthesis of a copolymer comprising Limonene/Methyl acrylate/Hydroxypropyl acrylate/Acrylic acid The following ingredients were polymerized as set forth below:

| | Ingredients | Parts by weight (grams) |
|---|---|---|
| Charge 1 | Limonene[3] | 30.00 |
| | Methyl Acrylate | 19.60 |
| | Hydroxypropyl Acrylate | 24.00 |
| Charge 2 | Di-tert Amyl Peroxide | 34.50 |
| | Butyl Acetate | 36.00 |
| Charge 3 | Methyl Acrylate | 176.00 |
| | Limonene | 273.00 |
| | Hydroxypropyl Acrylate | 216.00 |
| | Acrylic Acid | 7.00 |

[3] Available from Acros Organics.

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170 C at 120 PSI. After Charge 2 and 3 were in the reactor, the reaction mixture was held for 2 hours. The reactor was than cooled to 25° C., and vented. The solids content of the resulting polymer was determined to be 72.31% determined at 110° C. for one hour. The copolymer had number average molecular weight, $M_n$=1920 and polydispersity $M_w/M_n$=2.6 (determined by gel permeation chromatography using polystyrene as a standard), and hydroxy number of 115.

Example F

Synthesis of a copolymer comprising Limonene/Methyl acrylate/Hydroxypropyl acrylate/Acrylic acid The following ingredients were polymerized as set forth below:

| | Ingredients | Parts by weight (grams) |
|---|---|---|
| Charge 1 | Limonene | 30.00 |
| | Methyl Acrylate | 19.60 |
| | Hydroxypropyl Acrylate | 24.00 |
| Charge 2 | Di-tert Butyl Peroxide | 50.00 |
| | Isopropanol | 36.00 |
| Charge 3 | Methyl Acrylate | 176.00 |
| | Limonene | 273.00 |
| | Hydroxypropyl Acrylate | 216.00 |
| | Acrylic Acid | 7.00 |

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170° C. at 146 PSI. After Charge 2 and 3 were in the reactor, the reaction mixture was held for 2 hours. The reactor was then cooled to 25° C., and vented. The solids content of the resulting polymer was determined to be 84.52% determined at 110° C. for one hour. The copolymer had number average molecular weight, $M_n=1930$ and polydispersity $M_w/M_n=2.7$ (determined by gel permeation chromatography using polystyrene as a standard), and hydroxy number of 105.

Example G

Synthesis of a copolymer comprising beta-Pinene/alpha-methyl Styrene/Methyl acrylate/Hydroxypropyl acrylate/Acrylic acid The following ingredients were polymerized as set forth below:

|  | Ingredients | Parts by weight (grams) |
|---|---|---|
| Charge 1 | Beta-Pinene | 27.27 |
|  | Methyl Acrylate | 17.60 |
|  | Hydroxypropyl Acrylate | 21.60 |
|  | Acrylic acid | 2.5 |
|  | Alpha-methyl Styrene | 9.00 |
| Charge 2 | Di-tert Amyl Peroxide | 31.05 |
|  | Butyl Acetate | 32.40 |
| Charge 3 | Methyl Acrylate | 158.40 |
|  | Beta-Pinene | 245.43 |
|  | Hydroxypropyl Acrylate | 194.40 |
|  | Acrylic Acid | 22.50 |
|  | Alpha-methyl Styrene | 81.00 |

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170° C. at 116 PSI. After Charge 2 and 3 were in the reactor, the reaction mixture was held for 2 hours. The reactor was then cooled to 25° C., and vented. The solids content of the resulting polymer was determined to be 72.41% determined at 110° C. for one hour. The copolymer had number average molecular weight, $M_n=4330$ and polydispersity $M_w/M_n=2.7$ (determined by gel permeation chromatography using polystyrene as a standard), and hydroxy number of 70.

Example H

Synthesis of a copolymer comprising beta-Pinene/2-Ethylhexyl acrylate acrylate/Hydroxypropyl acrylate/Acrylic acid The following ingredients were polymerized as set forth below:

|  | Ingredients | Parts by weight (grams) |
|---|---|---|
| Charge 1 | Beta-Pinene | 24.24 |
|  | Ethylhexyl Acrylate | 33.36 |
|  | Hydroxypropyl Acrylate | 19.20 |
| Charge 2 | Di-tert Amyl Peroxide | 27.60 |
|  | Butyl Acetate | 28.80 |
| Charge 3 | Ethylhexyl Acrylate | 300.24 |
|  | Beta-Pinene | 218.16 |
|  | Hydroxypropyl Acrylate | 172.80 |
|  | Acrylic Acid | 5.60 |

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170° C. at 114 PSI. After Charge 2 and 3 were in the reactor, the reaction mixture was held for 2 hours. The reactor was then cooled to 25° C., and vented. The solids content of the resulting polymer was determined to be 77.52% determined at 110° C. for one hour. The copolymer had number average molecular weight, $M_n=2900$ and polydispersity $M_w/M_n=2.5$ (determined by gel permeation chromatography using polystyrene as a standard), and hydroxy number of 104.

Example I

Synthesis of a copolymer comprising beta-Pinene/Methyl acrylate/Hydroxypropyl acrylate/Hydroxyethyl acrylate The following ingredients were polymerized as set forth below:

|  | Ingredients | Parts by weight (grams) |
|---|---|---|
| Charge 1 | Beta-Pinene | 150.00 |
|  | Methyl Acrylate | 111.50 |
|  | Hydroxypropyl Acrylate | 60.00 |
|  | Hydroxyethyl Acrylate | 53.50 |
|  | Butyl Acetate | 180.00 |
| Charge 2 | Di-tert Amyl Peroxide | 172.50 |
| Charge 3 | Methyl Acrylate | 1000.00 |
|  | Beta-Pinene | 1365.00 |
|  | Hydroxypropyl Acrylate | 550.00 |
|  | Hydroxyethyl Acrylate | 485.00 |
|  | Butyl Acetate | 125.00 |

Charge 1 was added to a 4-liter stirred stainless steel pressure reactor. The reactor was then pressured with nitrogen and held at 5 psig. The agitation on the reactor was set at 500 rpms and the reactor temperature was adjusted to 170° C. Charge 2 and 3 were added to the reactor over 2.5 hours. During the monomer addition the temperature was maintained at 170° C. at 135 PSI. After Charge 2 and 3 were in the reactor, the reaction mixture was held for 2 hours. The reactor was then cooled to 25° C., and vented. The solids content of the resulting polymer was determined to be 73.78% determined at 110° C. for one hour. The copolymer had number average molecular weight, $M_n=1050$ and polydispersity $M_w/M_n=3.3$ (determined by gel permeation chromatography using polystyrene as a standard), and hydroxy number of 133.

Example J

Synthesis of a copolymer comprising beta-Pinene/Methyl Acrylate/Hydroxypropyl Acrylate The following ingredients were polymerized as set forth below:

| | Ingredients | Parts by weight (grams) |
|---|---|---|
| Charge 1 | Beta-pinene | 1000 |
| | Methyl Acrylate | 800 |
| | Hydroxypropyl acrylate | 200 |
| Charge 2 | DTAP[4] | 60 |
| Charge 3 | DTAP | 20 |

[4]A radical initiator, di (tert-amyl) peroxide, available from Arkema, Inc.

Charge 1 was added to a pressure rated, stainless steel reaction vessel under a nitrogen atmosphere and heated to 175° C. The initial charge of DTAP (Charge 2) was fed into the vessel over a period of 1 hour. When the feed was complete, the reaction mixture was held for an additional 2 hours at 175° C. The second charge of DTAP (Charge 3) was fed into the vessel over a period of 30 minutes. When the feed was complete, the reaction mixture was held for an additional 2 hours at 175° C. At the end of the hold, the reaction mixture was cooled to 40° C. and the material collected. The material had measured solids of 73.06 percent.

Example K

Synthesis of a Copolymer Comprising beta-Pinene/Methyl Acrylate/Hydroxypropyl Acrylate A mixture of 38.7% beta-pinene, 25.0% methyl acrylate, 30.7% hydroxypropyl acrylate, 0.8% acrylic acid and 4.8% di-t-butyl peroxide was continuously fed to a 5 gallon continuous stirred tank reactor at a rate calculated to give a average residence time of 20 minutes. The reactor was maintained at a pressure of 500 psig and a temperature of 365° F. The reaction product was continuously pumped to a 30 gallon flash tank maintained at 20% fill level together with di-t-amyl peroxide (4% by weight on reaction product). The contents of the flash tank were maintained at 300° F. The output from the flash tank was mixed with sufficient butyl acetate in a static mixer to reduce the solids content to 81% and drained into storage containers. The reaction was run for a period of 6.5 hours. The resulting resin had a weight average molecular weight of 5000.

Example 2

Resins used for Melamine crosslinked clearcoats:

Clear, film-forming compositions were prepared by mixing together, in order, the following ingredients; each formula (F1-F5) was comprised of 46% crosslinker and 54% polymer. F1 represents a control formulation.

Melamine Crosslinked Clearcoat System

| | Solution Wt. (grams) | | | | |
|---|---|---|---|---|---|
| Ingredient | F1 | F2 | F3 | F4 | F5 |
| Methyl n-Amyl Ketone | 7.25 | 7.25 | 7.25 | 7.25 | 7.25 |
| Xylene | 2.20 | 2.20 | 2.20 | 2.20 | 2.20 |
| Aromatic 100 | 7.48 | 7.48 | 7.48 | 7.48 | 7.48 |
| Ethylene Glycol Monohexyl Ether | 0.71 | 0.71 | 0.71 | 0.71 | 0.71 |
| Ethanol | 3.31 | 3.31 | 3.31 | 3.31 | 3.31 |
| RESIMINE 757[5] | 47.42 | 47.42 | 47.42 | 47.42 | 47.42 |

-continued

| | Solution Wt. (grams) | | | | |
|---|---|---|---|---|---|
| Ingredient | F1 | F2 | F3 | F4 | F5 |
| Example A* | 79.41 | — | — | — | — |
| Example B, prepared as described in Example 1. | — | 72.65 | — | — | — |
| Example C, prepared as described in Example 1. | — | — | 72.09 | — | — |
| Example D, prepared as described in Example 1. | — | — | — | 67.92 | — |
| Example E, prepared as described in Example 1. | — | — | — | — | 74.68 |
| Dodecylbenzylsulfonic Acid Solution[6] | 1.43 | 1.43 | 1.43 | 1.43 | 1.43 |
| Total | 149.21 | 142.45 | 141.89 | 137.72 | 144.48 |

[5]A fully alkylated methoxy/butoxy functional aminoplast, available from Solutia, Inc.
[6]Available from Nusil Technology.
*Hydroxypropyl Acrylate, N-Butyl Methacrylate, N-Butyl Acrylate, Styrene, Methyl Methacrylate, Acrylic Acid. Polymer is 68% by weight solids in Aromatic solvent-100 Type/Methyl Ether Propylene Glycol Acetate/Acetone CP at a weight ratio of 38/57/5.

More specifically, each component was mixed sequentially with agitation. The final viscosity was adjusted with 1/1/1 aromatic solvent 100 type/methyl n-amyl ketone/xylene and 4/1 methyl n-amyl ketone/2-butoxyethanol acetate by weight, to 27"±1" at room temperature, measured on a # 4 Ford cup available from Paul N. Gardner Company, Inc. The test substrate was ACT cold rolled steel panels 10.16 cm by 30.48 cm available as APR45583 from ACT Laboratories, Inc. of Hillsdale, Mich. The clear coating compositions F1-F5 were applied to the panels at ambient temperature using an 8-path Wet Film Applicator, #14 available from Paul N. Gardner Company, Inc. Dry film thickness was targeted for about 30 micrometers (1.6 mils). Panels prepared from each coating were air flashed for 10 minutes and baked for 30 minutes at 285° F. (141° C.). Panels were baked in a horizontal position. Initial specular gloss was measured at 20° with a Novo Gloss Statistical Glossmeter from Gardco, where higher numbers indicate better performance.

Fischerscope H100 Microhardness Testing system measures hardness in newtons per millimeter squared. More specifically, the microhardness, measured in Newtons (N) per $mm^2$, of the coated test samples was determined by taking 1 measurement at a depth of 2 microns in the center area of the test sample prepared for each Example under the conditions of a 100 milliNewton load, 30 load steps and 0.5 second pauses between load steps. Mar gloss retention was tested by subjecting the coated panels to scratch testing by linearly scratching the coated surface with a weighted abrasive paper for ten double rubs using an Atlas AATCC Scratch Tester, Model CM-5, available from Atlas Electrical Devices Company of Chicago, Ill. The abrasive paper used was 3M 281Q WETORDRY PRODUCTION 9 micron polishing paper sheets, which are commercially available from 3M Company of St. Paul, Minn. Panels were then rinsed with tap water and carefully patted dry with a paper towel. The 20° gloss was measured on the scratched area of each test panel (mar gloss). Using the lowest 20° gloss reading from the scratched area, the scratch results are reported as the percent MAR Retention using the following calculation: mar gloss/initial gloss×100. Higher values for percent of gloss retained are desirable.

The property data has been summarized in Table 1.

TABLE 1

|  | F1 | F2 | F3 | F4 | F5 |
|---|---|---|---|---|---|
| 20° Gloss | 92 | 90 | 91 | 92 | 92 |
| Fischer Micro Hardness ("FMH") | 137 | 145 | 148 | 148 | 149 |
| % Mar Retention | 55 | 54 | 57 | 44 | 41 |

As can be seen in Table 1, the hardness of the formulations of the present invention (F2-F5) were higher than that of the control (F1), and the % Mar retention was comparable for samples F2 and F3 and slightly lower for F4 and F5.

Example 3

Clear film-forming compositions were prepared by mixing together, in order, the following ingredients. Each formula comprised one equivalent weight of isocyanate with one equivalent weight of polymer. F6 represents a control.

2K Isocyanate Crosslinked System

| Ingredient | Solution wts. (grams) F6 | F7 | F8 | F9 | F10 |
|---|---|---|---|---|---|
| Example L* | 89.29 | — | — | — | — |
| Example B | — | 70.55 | — | — | — |
| Example C | — | — | 81.43 | — | — |
| Example D | — | — | — | 81.75 | — |
| Example E | — | — | — | — | 89.08 |
| Ethyl 3-Ethoxypropionate | 30 | 30 | 30 | 30 | 30 |
| Methyl Ether Propylene Glycol Acetate | 10 | 10 | 10 | 10 | 10 |
| DESMODUR N 3300[7] | 37.5 | 47.79 | 39 | 35.01 | 35.58 |
| Dibutytin-dilaurate[8] | 0.05 | 0.05 | 0.05 | 0.05 | 0.05 |
| Polybutyl Acrylate[9] | 1.1 | 1.1 | 1.1 | 1.1 | 1.1 |
| 2 Ethyl Hexyl Acrylate[10] | 0.53 | 0.53 | 0.53 | 0.53 | 0.53 |
| Total | 168.47 | 160.02 | 162.11 | 158.44 | 166.34 |

[7]Polyisocyanate, available from Bayer.
[8]Catalyst, available from Atofina.
[9]Flow additive, available from DuPont.
[10]Flow additive, available from Solutia, Inc.
*Hydroxypropyl Acrylate, N-Butyl Methacrylate, N-Butyl Acrylate, Styrene, Methyl Methacrylate, Acrylic Acid. Polymer is 71% by weight solids in Aromatic solvent-100 Type/Xylene at a weight ratio of 46/54.

The formulations were prepared and tested as discussed in Example 2, with the exception that final viscosity of the formulations was adjusted with ethyl-3-ethoxypropionate, to 24"-26" at room temperature, measured on a # 4 Ford cup available from Paul N. Gardner Company, Inc.

TABLE 2

|  | F6 | F7 | F8 | F9 | F10 |
|---|---|---|---|---|---|
| 20° Gloss | 84 | 82 | 84 | 83 | 85 |
| FMH | 125 | 122 | 139 | 140 | 142 |
| % Mar Retention | 10 | 18 | 12 | 9 | 8 |

As demonstrated in Table 2, the formulations of the present invention had comparable or higher hardness and % mar retention as compared to the control.

Example 4

A clear, film forming composition was prepared by mixing together the following ingredients; each component was mixed sequentially with agitation:

TABLE 3

| Ingredient | Parts by weight (grams) | Solid weights (grams) |
|---|---|---|
| Xylene | 3.9 | — |
| Ethyl-3-Ethoxypropanoate | 3.51 | — |
| Aromatic Solvent - 150 Type | 10.54 | — |
| Butyl CELLOSOLVE acetate[11] | 1.83 | — |
| Butyl CARBITOL[12] | 2.93 | — |
| Butyl CARBITOL acetate[13] | 3.51 | — |
| Tridecyl Alcohol | 3.51 | — |
| Aromatic Solvent - 100 Type | 1.78 | — |
| Testbenzin | 1.83 | — |
| TINUVIN 928[14] | 1.95 | 1.95 |
| TINUVIN 292[15] | 0.78 | 0.78 |
| TINUVIN 123[16] | 0.78 | 0.78 |
| Acid catalyst[17] | 0.68 | 0.48 |
| SETAMINE US-138[18] | 41.6 | 29.10 |
| LAROTACT LR 9018[19] | 9.17 | 4.63 |
| Sag Control agent[20S] | 42.0 | 25.21 |
| ADDITOL XL 121[21] | 0.02 | 0.003 |
| WORLEE 315[22] | 0.39 | 0.05 |
| EFKA 6781[23] | 0.78 | 0.59 |
| Reduction Information: |  |  |
| Aromatic Solvent - 100 Type |  |  |
| Spray viscosity[24] (sec) | 30 |  |
| Paint temperature (° F.) | 72 |  |

[11]2-Butoxyethyl acetate solvent, available from Union Carbide Corp.
[12]Diethylene glycol monobutyl ether, available from Union Carbide Corp.
[13]2-(2-Butoxyethoxy) ethyl acetate, available from Union Carbide Corp.
[14]UV absorber, available from Ciba Specialty Chemicals Corp.
[15]Sterically hindered amine light stabilizer, available from Ciba Additives.
[16]Sterically hindered amine light stabilizer, available from Ciba Additives.
[17]Dodecyl benzene sulfonic acid solution, available from Chemcentral.
[18]Melamine formaldehyde resin, available from Nuplex Resins.
[19]Tris (alkyl carbamoyl) triazine, available from BASF AG.
[20]SCA acrylic resin, available from Nuplex Resins.
[21]Silicone glycol, available from Cytec Surface Specialties.
[22]Water soluble silicone additive, available from Worlee Chemie.
[23]Halogen free cationic compound, available from Efka Chemicals.
[24]Viscosity measured in seconds with a #4 FORD efflux cup at ambient temperature.

Various formulations were then prepared using the clear film forming composition described above in Table 3, and adding thereto an acrylic resin and/or the copolymers of the present invention, prepared as described in Example 1. F11 represents a control.

| Ingredient | F11 | F12 | F13 | F14 | F15 | F16 | F17 | F18 | F19 |
|---|---|---|---|---|---|---|---|---|---|
| Clear composition described in Table 3 above | 131.5 (63.6) | 131.5 (63.6) | 131.5 (63.6) | 131.5 (63.6) | 131.5 (63.6) | 131.5 (63.6) | 131.5 (63.6) | 131.5 (63.6) | 131.5 (63.6) |
| Acrylic resin[25] | 63.7 (41.1) | 48.2 (31.1) | 32.7 (21.1) | 17.2 (11.1) | — | — | — | — | — |
| Example C | — | 12.5 (10) | 25.0 (20) | 37.5 (30) | 51.4 (41.1) | — | — | — | — |
| Example D | — | — | — | — | — | 51.7 (41.1) | — | — | — |
| Example G | — | — | — | — | — | — | 57.2 (41.1) | — | — |
| Example F | — | — | — | — | — | — | — | 49.1 (41.1) | — |
| Example H | — | — | — | — | — | — | — | — | 53.0 (41.1) |

[25]A polymer comprising Cardura E, styrene, hydroxyethyl methacrylate, 2-ethylhexyl acrylate, acrylic acid at a weight average molecular weight ("Mw") of about 8000 having a hydroxyl equivalent weight ("EW") on solids of 370. Polymer is 65% by weight solids in Xylene/Solvesso 100 (available from Exxon) at a weight ratio of 34/66.

The film forming compositions F11-F19 were spray applied to a pigmented basecoat to form color-plus-clear composite coatings over primed electrocoated steel panels. The panels used were cold rolled steel panels (10.16 cm by 30.48 cm). Panels were coated with ED6060 electrocoat and 1177225A primer, both available from PPG Industries, Inc., and then with Obsidian Schwartz, a black metallic-pigmented water-borne basecoat, also available from PPG Industries, Inc. Basecoats were automated spray applied to the electrocoated and primed steel panels at ambient temperature (about 70° F. (21° C.)). A dry film thickness of about 0.6 to 0.8 mils (about 15 to 20 micrometers) was targeted for the basecoat. The basecoat panels were dehydrated for 10 minutes @ 176° F. (80° C.) prior to clearcoat application, The clear coating compositions were each automated spray applied to a basecoated panel at ambient temperature in two coats with an ambient flash between applications. Clearcoats were targeted for a 1.6 to 1.8 mils (about 41 to 46 micrometers) dry film thickness. All coatings were allowed to air flash at ambient temperature before the oven. Panels were baked for thirty minutes at 285° F. (141° C.) to fully cure the coating(s). A panel was prepared for both a horizontal bake position and a vertical bake position. Appearance measurements were taken for both the horizontal and vertical panels. The horizontal panel was also tested for physical properties such as, Mar Resistance, Acid Resistance, and Hardness. Properties for the coatings are reported below in Table 4 below.

TABLE 4

| | Appearance | | | | Acid Rating[29] | FMH[30] | Mar Resistance | |
|---|---|---|---|---|---|---|---|---|
| | 20° Gloss[26] | DOI[27] | LW[28] | SW[28] | | | 2 μm Crockmeter Mar[31] (% GR)[33] | 10 cycles Car Wash[32] (% GR)[33] |
| F11 | 94 | 94 | 3 | 14 | 4 | 117 | 90 | 79 |
| F12 | 94 | 94 | 3 | 14 | 5 | 121 | 88 | 81 |
| F13 | 93 | 94 | 3 | 15 | 4 | 125 | 90 | 82 |
| F14 | 93 | 94 | 3 | 14 | 6 | 126 | 86 | 80 |
| F15 | 92 | 94 | 3 | 15 | 6 | 129 | 89 | 80 |
| F16 | 93 | 94 | 3 | 13 | 4 | 133 | 87 | 75 |
| F17 | 95 | 96 | 4 | 13 | 6 | 134 | 92 | 76 |
| F18 | 93 | 97 | 3 | 13 | 7 | 130 | 94 | 75 |
| F19 | 93 | 81 | 5 | 18 | 9 | 61 | 92 | 80 |

[26]20° gloss was measured with a Statistical Novo-Gloss 20° gloss meter, available from Paul N. Gardner Company, Inc.
[27]Distinctness-of-image (DOI) was measured with a Hunter Associates DORIGON II DOI meter.
[28]Longwave (LW) and Shortwave (SW) measurements were made using a BYK Wavescan DOI.
[29]Acid resistance was evaluated by placing 50 μl drops of sulfuric acid solution of pH 2 onto the panel in triplicate. The panel is then placed in a 120° F. oven for 20' to allow the solution to evaporate. This constitutes one cycle. This cycle is repeated two more times. The panels are then washed with soap and water and towel dried. Ratings from 0-10 are given comparative to a set of known standards. A rating of 1 denotes no visible damage and a rating of 10 denotes complete loss of the coating.
[30]Performed as described in Example 2.
[31]Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Illinois. The abrasive paper used was 3M 281Q WETORDRY PRODUCTION 2 micron polishing paper sheets, available from 3M Company of St. Paul, Minnesota.
[32]10 cycle Car Wash measured after 10 double passes in Car Wash Apparatus from Amtec Kistler.
[33]% Gloss Retention (% GR) - Using the lowest 20° gloss reading from the scratched area, the % Gloss Retention is reported as the percent of the initial gloss retained after scratch testing using the following calculation: 100% * scratched gloss/initial gloss. Higher values for percent of gloss retained are desirable.

As demonstrated in Table 4, F12-F18 generally had comparable properties as compared with the control (F11).

Example 5

This example describes the preparation of a cationic resin that was prepared from the following ingredients:

| INGREDIENTS | PARTS BY WEIGHT |
| --- | --- |
| EPON 828[34] | 614.68 |
| Bisphenol-A | 265.42 |
| Example J | 205.31 |
| Ethyltriphenyl phosphonium iodide | 0.6 |
| Methyl isobutyl ketone | 13.52 |
| Crosslinker[35] | 277.33 |
| Diethanolamine | 8.4 |
| Diketimine[36] | 45.62 |
| EPON 828 | 14.84 |

[34]Available from Resolution.
[35]An amine functional crosslinker prepared as described below.
[36]The diketimine is derived from bis (hexamethylene) triamine (DYTEK BHMT-HP, available from Invista) and methyl isobutyl ketone (69.65% solids in methyl isobutyl ketone, yielding 39.5% hydrolyzed solids).

The EPON 828, bisphenol A and Example A copolymer, prepared as described in Example 1, were charged to a reaction vessel and heated under a nitrogen atmosphere to 125° C. Ethyl triphenyl phosphonium iodide then was added and the reaction mixture allowed to exotherm to about 140° C. The reaction was held at 135° C. for 2 hrs and 30 minutes and an epoxy equivalent was obtained. At this point, the charge of methyl isobutyl ketone was added and the reaction mixture was cooled to 98° C. Crosslinker and diethanolamine were added in succession. The mixture was allowed to exotherm and then heated until a temperature of 122° C. was established. The mixture was held at 122° C. for 15 minutes. Diketimine was then added and the mixture held at 121° C. for 25 minutes more. To this was added EPON 828 and the mixture held for 45 minutes more at 125° C. The resin mixture (1624.86 parts) was dispersed in aqueous medium by adding it to a mixture of 45.87 parts of sulfamic acid and 863.94 parts of deionized water. The dispersion was further thinned with 506.94 parts of deionized water and 960.51 parts of deionized water in stages and vacuum stripped to remove organic solvent to give a dispersion having a solids content of 46.6 percent.

Crosslinker

The crosslinker was prepared from the following ingredients:

| INGREDIENTS | PARTS BY WEIGHT |
| --- | --- |
| Bis (hexamethylene) triamine[37] | 107.7 |
| Propylene carbonate[38] | 102.09 |

[37]Available from Invista as DYTEK BHMT-HP.
[38]Available from Sigma-Aldrich Co.

The bis (hexamethylene) triamine was charged to a reaction vessel and heated under a nitrogen atmosphere. The propylene carbonate was added over 3 hrs. The reaction mixture exothermed to 66° C. and was then cooled and maintained at 59° C. The mixture was held at 59° C. for an additional 2 hrs and then allowed to cool. The material had an MEQ amine of 2.308 and the mixture was collected.

The resin prepared as described above was used in the preparation of an electrodeposition bath composition according to the present invention. The electrodepostion bath was prepared from a mixture of the following ingredients:

| INGREDIENTS | PARTS BY WEIGHT |
| --- | --- |
| resin cationic | 1407.9 |
| Plasticizer[39] | 34.5 |
| Solvent[40] | 19 |
| pigment paste prepared as described below | 230.8 |
| deionized water | 2107.8 |

[39]MAZON-1651 is a plasticizer based on butyl carbitol and formaldehyde, available from BASF.
[40]Ethylene glycol monohexylether, available from Dow.

The bath was made by adding the plasticizer and solvent to the resin under agitation. The blend was then reduced with 500 parts of the deionized water. The pigment paste was reduced with 300 parts of the deionized water, and then blended into the reduced resin mixture under agitation. The remainder of the deionized water was then added under agitation. Final bath solids were about 22%, with a pigment to resin ratio of 0.15:1.0. The paint was allowed to agitate at least two hours. Twenty percent of the total paint weight was removed by ultrafiltration and replaced with deionized water.

A pigment paste used in the electrodeposition bath compositions of the present invention, prepared as described above, was prepared from a mixture of the following ingredients:

| INGREDIENTS | PARTS BY WEIGHT |
| --- | --- |
| cationic grind resin[41] | 439.6 |
| SURFYNOL GA[42] | 9.1 |
| catalyst paste[43] | 190.8 |
| aluminum silicate[44] | 121.4 |
| CSX-333[45] | 7.3 |
| KRONOS 2310[46] | 417.5 |
| Deionized water | 95.5 |

[41]As described in Example 2 of U.S. Pat. No. 4,715,898, plus 2% by weight on solids of ICOMEEN T-2, available from BASF.
[42]Nonionic surfactant, available from Air Products and Chemicals, Inc.
[43]Dibutyltinoxide catalyst paste, prepared as described below.
[44]Available from Engelhard Corporation.
[45]Carbon black beads, available from Cabot Corp.
[46]Titanium dioxide pigment, available from Kronos Worldwide, Inc.

The above ingredients were added sequentially under high shear agitation. After the ingredients were thoroughly blended, the pigment paste was transferred to a vertical sand mill and ground to a Hegman value of about 7.25. The pigment paste was then collected. The measured solids were 63% following 1 hour at 110° C.

The catalyst paste used in preparation of the pigment paste was prepared from a mixture of the following ingredients:

| INGREDIENTS | PARTS BY WEIGHT |
| --- | --- |
| cationic grind resin[47] | 527.7 |
| n-butoxypropanol | 6.9 |
| FASCAT 4201[48] | 312.0 |
| Deionized water | 59.8 |

[47]As described in Example 2 of U.S. Pat. No. 4,715,898, plus 2% by weight on solids of ICOMEEN T-2.
[48]Dibutyl tin oxide, available from Arkema, Inc.

The catalyst paste was prepared by sequentially adding the above ingredients under high shear agitation. After the ingredients were thoroughly blended, the pigment paste was transferred to a vertical sand mill and ground to a Hegman value of about 7.25. The catalyst paste was then collected. The measured solids were 51% following 1 hr @ 110° C.

Electrocoating Procedure

The electrodeposition bath composition prepared as described above was electrodeposited onto phosphated electrogalvanized panels, commercially available from ACT Laboratories. The phosphate, which is commercially available from PPG Industries, Inc., was CHEMFOS 700 with a CHEMSEAL 59 rinse. Conditions for cationic electrodeposition were 3 minutes at 99° F. at 250 volts DC to yield a cured film thickness of 0.85 mils. The electrocoated substrate was cured in an electric oven at 340° F. for 30 minutes. The electrocoated substrate was then topcoated with a commercial basecoat/clearcoat system available from PPG Industries, Inc. The commercial topcoat system was BWB8554R white basecoat and WTKR2000 2K ISO clearcoat. The electrocoat described in these examples was evaluated for appearance and chip versus a standard. The standard control system was ED-6100H electrocoat and 1177-225AR primer surfacer.

The appearance was measured using a BYK Gardner wave scan as described above and the results are given in Table 5. The chip was evaluated as described in PPG Cleveland ETP QWI-0630.0 but using 2 pints of gravel instead of the prescribed 1 pint. The results are given in Table 2.

TABLE 5

| Electrocoat/Primer Surfacer | LW | SW | Chip rating (10-best, 0-worst) |
|---|---|---|---|
| Electrocoat of this example/none | 2.2 | 15.0 | 7 |
| ED-6100H/1177-225AR | 2 | 13.9 | 6 |

As demonstrated in Table 5, the system of the present invention had higher LW and SW and better chip resistance without the use of primer surfaces, as compared with the control.

Example 6

Two different 2K systems were prepared using Example G, prepared as described in Example 1. Both of the 2K systems were clearcoats crosslinked with an isocyanate package, the first at 1.1/1 isocyanate to hydroxyl ratio (NCO/OH), (referred to below as F20), and the second at a NCO/OH ratio of 1.3/1 (referred to below as F21).

Ingredients for each pack 1 as described below, the clearcoat package, were blended and mixed together and set aside. The ingredients of pack 2, the hardener or curative package, were blended together and set aside. Pack 1 and Pack 2 were mixed together just prior to spray application. The clearcoats were applied over DBC 18492 blue metallic basecoat using a DeVilbiss GTI spray gun. The clearcoat was applied in two coats to achieve approximately a 2.5 mils dry film thickness. The applied coatings were allowed the cure overnight at room temperature before testing.

The substrate used was APR 43741 ED primed and sealed panel from ACT Laboratories, Hillsdale, Mich.; the panels were sanded with 400 grit sand paper prior to basecoating.

The basecoat, DBC 18492 light blue metallic, available from PPG Industries, Inc., reduced 100% with D870 thinner before being applied over the substrate.

| F20 | Formula Weight | Solid Resin |
|---|---|---|
| PACK 1: | | |
| Example G | 79.20 | 65.20 |
| BYK 300[49] | 0.50 | 0.25 |
| TINUVIN 292[50] | 1.20 | 1.20 |
| CHISORB 328[51] | 1.00 | 1.00 |
| DBTDL[52] | 0.20 | 0.20 |
| PM ACETATE[53] | 20.83 | |
| SOLVENT BLEND[54] | 30.00 | |
| Sub Total | 132.93 | 67.94 |
| PACK 2: | | |
| Z4470 BA[55] | 22.90 | 16.03 |
| DESMODUR 3400[56] | 16.03 | 16.03 |
| MIBK[57] | 1.14 | |
| Sub Total | 40.07 | 32.06 |
| TOTAL: | 173.00 | 100.00 |

| % Wt Solid | VOC | Wt/Gal | Eq Ratio NCO/OH |
|---|---|---|---|
| 57.80 | 3.52 | 8.35 | 1.10 |

| F21 | Formula Weight | Solid Resin |
|---|---|---|
| PACK 1: | | |
| Example G | 74.71 | 61.59 |
| BYK 300[47] | 0.50 | 0.25 |
| TINUVIN 292[48] | 1.20 | 1.20 |
| CHISORB 328[49] | 1.00 | 1.00 |
| DBTDL[50] | 0.20 | 0.20 |
| PM ACETATE[51] | 20.69 | |
| SOLVENT BLEND[52] | 30.00 | |
| Sub Total | 128.30 | 64.24 |
| PACK 2: | | |
| Z4470 BA[53] | 25.54 | 17.88 |
| DESMODUR 3400[54] | 17.88 | 17.88 |
| MIBK[55] | 1.28 | |
| Sub Total | 44.70 | 35.76 |
| TOTAL: | 173.00 | 100.00 |

| % Wt Solid | VOC | Wt/Gal | Eq Ratio NCO/OH |
|---|---|---|---|
| 57.80 | 3.53 | 8.35 | 1.30 |

[47] Available from BYK Chemie.
[48] Available from Ciba.
[49] Available from Chitec Chemical.
[50] DBTDL (dibutyl tin dilaurate), available from Air Products.
[51] Available from Dow Chemical.
[52] SOLVENT BLEND, available from PPG Industries.
[53] Available from BA Bayer Chemical.
[54] Available from Bayer Chemical.
[55] MIBK (methyl isobutyl ketone), available from Eastman Chemical.

TABLE 6

| Test | F20 | F21 |
|---|---|---|
| Initial viscosity[58] | 87.5 cps | 78.5 cps |
| Cotton Time[59] | 50 minutes | 40 minutes |
| Gloss 20°[60] | 88 | 88 |
| Konig hardness[61] (24 hours) | 18 | 21 |
| Konig hardness (1 week cure) | 32 | 36 |

[58] Viscosity was measured by a Brookfield LVT viscometer using a #2 spindle at 60 rpm.
[59] Cotton Time was measured by dropping a cotton ball on the coating, waiting 5 seconds and tuning the panel over to see if the cotton ball falls off. The time in minutes from spray application to the time the cotton ball cleanly falls off the coating is recorded.
[60] Gloss was measure by a Byk-Gardner micro-TRI-gloss.
[61] Konig hardness was measured after a twenty four hour cure and a 1 week cure using a Konig pendulum hardness machine by Byk-Gardner.

Example 7

Clearcoat, 2K, formulations comprising abrasion resistant particles were prepared using the components described below. Each component shown in the tables below was mixed sequentially with agitation to form Pack 1 and Pack 2. Pack 1 and Pack 2 were then mixed together with agitation to form the clear coating composition. The amounts shown in the Tables are parts by weight in grams.

F22

| Ingredient | Solid Weight (grams) | Weight (grams) |
|---|---|---|
| PACK 1 | | |
| Amyl acetate | — | 7.85 |
| SOLVESSO 100[62] | — | 18.13 |
| Butyl CELLOSOLVE acetate | — | 4.80 |
| Butyl CARBITOL acetate | — | 2.40 |
| TINUVIN 123 | 0.50 | 0.50 |
| TINUVIN 928 | 2.00 | 2.00 |
| Treated Colloidal Silica[63] | 1.50 | 10.42 |
| Siloxane Borate[64] | 0.50 | 1.00 |
| Example C, prepared as described in Example 1 | 45.11 | 60.22 |
| Polyester Polyol[65] | 5.00 | 5.00 |
| CYMEL 202[66] | 5.00 | 6.25 |
| BYK 337[67] | 0.02 | 0.10 |
| NACURE 4167[68] | 1.00 | 4.00 |
| TMP/Empol Polyol[69] | 5.00 | 5.65 |
| PACK 2 | | |
| Amyl acetate | — | 10.00 |
| SOLVESSO 100 | — | 1.62 |
| DESMODUR N 3300 | 25.83 | 25.83 |
| DESMODUR Z 4470 BA | 13.56 | 19.37 |
| TOTAL | 105.02 | 185.14 |

[62]Aromatic solvent - 100 type, available from Exxon.
[63]"Silica B" prepared as described in U.S. Patent Serial No. 11/145,812, filed Jun. 6, 2005, incorporated by reference herein.
[64]Prepared as described in U.S. Pat. No. 6,623,791B2, incorporated by reference herein.
[65]A polymer comprising C36 Diabasic Acid, neopentyl glycol, cyclohexanedimethanol-1,4,trimethylol propoane at a Mw of about 1300 having a hydroxyl EW on solids of 189. The polymer is 100% solids.
[66]Melamine formaldehyde resin, available from CYTEC Industries, Inc.
[67]Solution of a polyether modified poly-dimethyl-siloxane, available from BYK-Chemie.
[68]Latent catalyst available from King Industries, Inc.
[69]A polymer comprising trimethylol propane and EMPOL 1008 (available from Cognis Corporation) at a Mw of about 4500 having a hydroxyl EW on solids of 199. The polymer is 89% solids in n-butyl acetate.

F23

| Ingredient | Solid Weight (grams) | Weight (grams) |
|---|---|---|
| PACK 1 | | |
| Amyl acetate | — | 7.85 |
| SOLVESSO 100 | — | 18.13 |
| Butyl CELLOSOLVE acetate | — | 4.80 |
| Butyl CARBITOL acetate | — | 2.40 |
| TINUVIN 123 | 0.50 | 0.50 |
| TINUVIN 928 | 2.00 | 2.00 |
| Treated Colloidal Silica | 1.50 | 10.42 |
| Siloxane Borate | 0.50 | 1.00 |
| Example D, prepared as described in Example 1. | 48.24 | 60.69 |
| Polyester Polyol | 5.00 | 5.00 |
| CYMEL 202 | 5.00 | 6.25 |
| BYK 337 | 0.02 | 0.10 |
| NACURE 4167 | 1.00 | 4.00 |
| Polyester Polyol as described in footnote 65 | 5.00 | 5.65 |
| PACK 2 | | |
| Amyl acetate | — | 13.75 |
| SOLVESSO 100 | — | 1.62 |
| DESMODUR N 3300 | 23.66 | 23.66 |
| DESMODUR Z 4470 BA | 12.61 | 18.01 |
| TOTAL | 105.03 | 185.83 |

F24

| Ingredient | Solid Weight (grams) | Weight (grams) |
|---|---|---|
| PACK 1 | | |
| Amyl acetate | — | 14.00 |
| SOLVESSO 100 | — | 10.00 |
| Butyl CELLOSOLVE acetate | — | 4.50 |
| Butyl CARBITOL acetate | — | 3.00 |
| TINUVIN 123 | 0.25 | 0.25 |
| TINUVIN 292 | 0.25 | 0.25 |
| TINUVIN 928 | 3.00 | 3.00 |
| Treated Colloidal Silica | 2.00 | 13.89 |
| Siloxane Borate | 0.50 | 1.00 |
| Example I, prepared as described in Example 1. | 48.70 | 63.84 |
| CYMEL 202 | 5.00 | 6.25 |
| BYK 306[70] | 0.02 | 0.15 |
| NACURE 4167 | 0.50 | 2.00 |
| Polyester Polyol as described in footnote 65 | 7.79 | 8.76 |
| PACK 2 | | |
| Amyl acetate | — | 10.00 |
| Phenyl Acid Phosphate[71] | 0.25 | 0.33 |
| DESMODUR N 3300 | 27.35 | 27.35 |
| DESMODUR Z 4470 BA | 10.67 | 15.24 |
| TOTAL | 106.28 | 183.81 |

[70]Solution of a polyether modified poly-dimethyl-siloxane, available from BYK-Chemie.
[71]Phenyl acid phosphate solution, available from Rhodia.

F25

| Ingredient | Solid Weight (grams) | Weight (grams) |
|---|---|---|
| PACK 1 | | |
| Amyl acetate | — | 14.00 |
| SOLVESSO 100 | — | 10.00 |
| Butyl CELLOSOLVE acetate | — | 4.50 |
| Butyl CARBITOL acetate | — | 3.00 |
| TINUVIN 123 | 0.25 | 0.25 |
| TINUVIN 292 | 0.25 | 0.25 |
| TINUVIN 928 | 3.00 | 3.00 |
| Treated Colloidal Silica | 2.00 | 13.89 |
| Siloxane Borate | 0.50 | 1.00 |
| Acrylic Polyol[72] | 44.21 | 69.62 |
| CYMEL 202 | 5.00 | 6.25 |
| BYK 306 | 0.02 | 0.15 |
| NACURE 4167 | 0.50 | 2.00 |
| Polyester Polyol as described in footnote 65 | 11.82 | 13.30 |
| PACK 2 | | |
| Amyl acetate | — | 9.09 |
| Phenyl Acid Phosphate[71] | 0.25 | 0.33 |

-continued

| Ingredient | Solid Weight (grams) | Weight (grams) |
|---|---|---|
| DESMODUR N 3300 | 27.72 | 27.72 |
| DESMODUR Z 4470 BA | 10.79 | 15.41 |
| TOTAL | 106.31 | 193.76 |

[72] 14% butyl methacrylate, 15% butyl acrylate, 28% isobornyl methacrylate, 23% hydroxypropyl methacrylate, 20% hyrdoxethyl methacrylate as 63.5% solids in a solvent blend of [95% propylene glycol methyl ether (DOWANOL PM from Dow Chemical) and 5% SOLVESSO 100 (aromatic hydrocarbon from Exxon)].

The film forming compositions F22-F25 were spray applied to a pigmented basecoat to form color-plus-clear composite coatings over primed electrocoated steel panels. The panels use were ACT E60 EZG G60 steel panels (10.16 cm by 30.48 cm) with ED-6150MB electrocoat available from ACT Laboratories, Inc. The panels were coated with Black 40, a black pigmented water-borne basecoat available from BASF. Basecoats were automated spray applied to the electrocoated steel panels at ambient temperature (about 70° F. (21° C.)). A dry film thickness of about 0.4 to 0.5 mils (about 10 to 13 micrometers) was targeted for the basecoat. The basecoat panels were dehydrated for 5 minutes @ 176° F. (80° C.) prior to clearcoat application.

The clear coating compositions were each automated spray applied to a basecoated panel at ambient temperature in two coats with an ambient flash between applications. Clearcoats were targeted for a 1.5 to 1.7 mils (about 38 to 43 micrometers) dry film thickness. All coatings were allowed to air flash at ambient temperature before the over. Panels were baked for thirty minutes at 285° F. (141° C.) to fully cure the coating(s). A panel was prepared for both a horizontal bake position and a vertical bake position. Appearance measurements were taken for both the horizontal and vertical panels. The horizontal panel was also tested for physical properties such as Mar Resistance (Amtec car wash and Atlas Crockmeter) and Hardness. Properties for the coatings are reported below in the tables below.

Horizontal Position

|  | F22 | F23 | F24 | F25 Control Acrylic |
|---|---|---|---|---|
| 20° Gloss | 86 | 86 | 85 | 84 |
| DOI | 96 | 94 | 94 | 92 |
| Shortwave | 28 | 28 | 27 | 28 |
| Longwave | 5 | 6 | 4 | 4 |
| FMH | 132 | 125 | 118 | 116 |
| 10 Cycles Amtec Car Wash (% Gloss Retention) | 84 | 78 | 86 | 88 |
| 10 Cycles Atlas Crockmeter (% Gloss Retention) | 70 | 65 | 62 | 77 |

Vertical Position

|  | F22 | F23 | F24 | F25 Control Acrylic |
|---|---|---|---|---|
| 20° Gloss | 86 | 86 | 85 | 84 |
| DOI | 93 | 92 | 78 | 92 |
| Shortwave | 25 | 23 | 44 | 28 |
| Longwave | 16 | 16 | 16 | 14 |

As demonstrated in these tables, the formulations of the present invention (F22-F24) generally had comparable properties as compared with the control (F25).

Example 8

This example describes the preparation of a cationic resin that was prepared from the following ingredients:

| INGREDIENTS | PARTS BY WEIGHT |
|---|---|
| EPON 828 | 456.76 |
| Bisphenol-A | 197.23 |
| Methyl isobutyl ketone (1) | 30.80 |
| Ethyltriphenyl phosphonium iodide | 0.45 |
| Methyl isobutyl ketone (2) | 33.75 |
| Crosslinker, prepared as described below | 283.68 |
| Diethanolamine | 6.98 |
| DETA diketimine | 24.92 |
| EPON 828 | 8.95 |
| Example K, prepared as described in Example 1 | 782.55 |

The EPON 828, bisphenol A, methyl isobutyl ketone (1) and ethyltriphenyl phosphonium iodide were charged to a reaction vessel and heated under a nitrogen atmosphere to 135° C. and the reaction mixture allowed to exotherm to about 140° C. The reaction was held at 135° C. for 2 hours and then the charge of methyl isobutyl ketone (2) was added and the reaction mixture was cooled to 115° C. The crosslinker and diethanolamine were added in succession. The mixture was allowed to exotherm and then heated until a temperature of 122° C. was established. The mixture was held at 122° C. for 45 minutes. DETA diketimine was then added and the mixture held at 122° C. for 45 minutes more. To this was added EPON 828 and the mixture held for 30 minutes more at 125° C. Example K was then added, the temperature was adjusted to 122° C. and the mixture held for one hour. The resin mixture (1760 parts) was dispersed in aqueous medium by adding it to a mixture of 34.33 parts of sulfamic acid and 907.96 parts of deionized water. The dispersion was further thinned with 600.50 parts of deionized water and 608.40 parts of deionized water in stages and vacuum stripped to remove organic solvent to give a dispersion having a solids content of 43.3 percent.

Crosslinker

The crosslinker was prepared from the following ingredients:

| INGREDIENTS | PARTS BY WEIGHT |
|---|---|
| Bis (hexamethylene) triamine | 3675.69 |
| Propylene carbonate | 2884.32 |
| Methyl isobutyl ketone | 1640.00 |

The bis (hexamethylene) triamine was charged to a reaction vessel and heated under a nitrogen atmosphere. The propylene carbonate was added over 3 hours. The reaction mixture exothermed to 68° C. and was then cooled and maintained at 60° C. The mixture was held at 60° C. for an additional 2 hours and then methyl isobutyl ketone was added.

An electrodeposition bath composition according to the present invention, identified below as F26, was prepared from a mixture of the following ingredients:

| INGREDIENTS | PARTS BY WEIGHT |
| --- | --- |
| Cationic resin, prepared as described above | 1440.0 |
| Plasticizer as described in footnote 39 | 32.8 |
| Solvent as described in footnote 40 | 19.0 |
| propylene glycol monomethyl | 9.1 |
| pigment paste, prepared as described below | 223.0 |
| deionized water | 2076.1 |

The bath was made by adding the plasticizer and solvent to the resin under agitation. The blend was then reduced with 500 parts of the deionized water. The pigment paste was reduced with 300 parts of the deionized water, and then blended into the reduced resin mixture under agitation. The remainder of the deionized water was then added under agitation. Final bath solids were about 20%, with a pigment to resin ratio of 0.12:1.0. The paint was allowed to agitate at least two hours. Thirty percent of the total paint weight was removed by ultrafiltration and replaced with deionized water.

The pigment paste used in the electrodeposition bath compositions of the present invention, prepared as described above, was prepared from a mixture of the following ingredients:

| INGREDIENTS | PARTS BY WEIGHT |
| --- | --- |
| cationic grind resin as described in footnote 41 | 525.3 |
| SURFYNOL GA | 1.4 |
| Catalyst paste as described in footnote 43 | 175.3 |
| Aluminum silicate as described in footnote 44 | 316.6 |
| CSX-333 | 4.3 |
| TRONOX CR800E[73] | 40.3 |
| deionized water | 50.3 |

[73]Titanium dioxide pigment, available from Tronox Inc.

The above ingredients were added sequentially under high shear agitation. After the ingredients were thoroughly blended, the pigment paste was transferred to a vertical sand mill and ground to a Hegman value of about 7.25. The pigment paste was then collected. The measured solids were 55% following 1 hr at 110° C.

Electrocoating Procedure

The bath composition prepared as described above was electrodeposited onto phosphated cold rolled steel panels, commercially available from ACT Laboratories. The phosphate, which is commercially available from PPG Industries, Inc., is CHEMFOS 700 with a deionized water rinse. Conditions for cationic electrodeposition were 2 minutes at 92° F. at 125 volts DC to yield a cured dry film thickness of 0.80 mils. The electrocoated substrate was cured in an electric oven at 350° F. for 25 minutes. The electrocoated panels were tested against a standard electrocoat product and the results are recorded in the table below. The control product was ED-6280 electrocoat available from PPG Industries, Inc.

TABLE

| | F26 | ED6280 Control Paint |
| --- | --- | --- |
| Profile[74] | 8/12 | 7/9.5 |
| QCT Humidity Adhesion[75] | 10/10 | 10/10 |
| 30 cycles Corrosion Testing[76] | 4.5 mm scribe creep | 4.25 mm scribe creep |

[74]Profiles were measured using a Taylor Hobson Surtronic 3+ Profilometer with cutoff lengths of 0.03 inch and 0.10 inch.
[75]Crosshatch adhesion performed before and after condensing humidity exposure for 16 hours at 140° F. on a QCT condensation tester (Q-Panel Company, Cleveland, OH).
[76]Each of the coated panels was scribed, cutting through the coating to the metal substrate in an X pattern. The test panels were then subjected to cyclic corrosion testing by rotating test panels through a salt solution, room temperature dry, and humidity and low temperature in accordance with General Motors test method, GM TM 54-26. Scribe creep is reported as the average distance (in millimeters) of corrosion from the scribe mark.

Whereas particular embodiments of this invention have been described above for purposes of illustration, it will be evident to those skilled in the art that numerous variations of the details of the present invention may be made without departing from the invention as defined in the appended claims.

Therefore we claim:

1. A coating comprising a hydroxy functional polymer comprising a terpene and a hydroxy functional acrylic monomer that is polymerized with terpene by free radical polymerization, wherein the monomer is not maleic acid/anhydride, and wherein the hydroxy functional polymer comprises 30 weight % or greater of the terpene.

2. The coating of claim 1, wherein the terpene comprises α-pinene.

3. The coating of claim 1, wherein the terpene comprises β-pinene.

4. The coating of claim 1, wherein the terpene comprises limonene.

5. The coating of claim 1, wherein the terpene comprises turpentine.

6. The coating of claim 1, wherein the hydroxy functional polymer crosslinks to form part of the coating film.

7. The coating of claim 1, wherein the hydroxy functional polymer comprises 30 wt % or greater of the coating, based on total solids weight.

8. The coating of claim 1, wherein the hydroxy functional polymer comprises 50 wt % or greater of the coating, based on total solids weight.

9. The coating of claim 1, wherein the coating is an electrodepositable coating.

10. The coating of claim 1, wherein the coating comprises a colorant.

11. The coating of claim 1, wherein the coating is substantially clear.

12. The coating of claim 1, wherein the coating is a two component coating, and the hydroxy functional polymer is in one component and a curing agent is in another component.

13. A cured coating comprising the hydroxy functional polymer of claim 1.

14. The coating of claim 13, wherein the terpene comprises α-pinene.

15. The coating of claim 13, wherein the terpene comprises β-pinene.

16. The coating of claim 13, wherein the terpene comprises limonene.

17. The coating of claim 13, wherein the terpene comprises turpentine.

18. The coating of claim 1 further comprising urea, wherein the urea is formed from a reaction mixture comprising an isocyanate-functional component and an amine-functional component, wherein ratio of equivalents of isocyanate groups to equivalents of amine groups is greater than 1 and the isocyanate-functional component and the amine-functional component can be applied to a substrate at a volume mixing ratio of 1:1.

19. A hydroxy functional polymer comprising a terpene and a hydroxy functional acrylic monomer that is polymerized with terpene by free radical polymerization, wherein the monomer is not maleic acid/anhydride, and wherein the hydroxy functional polymer comprises 30 weight % or greater of the terpene.

* * * * *